3,481,964
PROCESS FOR PREPARING ORGANOSILICON NITROGEN COMPOUNDS
Mohamed Roshdy Ismail, Spich, and Hans-Joachim Kötzsch, Troisdorf, Germany, assignors to Dynamit Nobel Aktiengesellschaft, Troisdorf, Germany
No Drawing. Filed June 16, 1966, Ser. No. 557,896
Claims priority, application Germany, June 15, 1965, D 47,510
Int. Cl. C07f 7/10; C01b 33/04
U.S. Cl. 260—448.2                              9 Claims

ABSTRACT OF THE DISCLOSURE

Process for preparing organo-silicon nitrogen compounds comprising reacting
(a) a halogen silane of the formula $(R_1R_2R_3)SiX$ wherein $R_1$ and $R_2$ are each one of hydrogen, $C_1$ to $C_{18}$ alkyl, alkenyl, cycloalkyl, aryl, alkoxy, aralkoxy, and halogen, $R_3$ is hydrogen, $C_1$ to $C_{18}$ alkyl, alkenyl, cycloalkyl, aryl, alkoxy and aroxy and X is halogen, and
(b) a trivalent nitrogen compound of the formula $(R_4R_5)NH$, wherein $R_4$ and $R_5$ are each hydrogen, $C_1$ to $C_{18}$ alkyl, alkenyl, cycloalkyl and aryl and together can be $—(CH_2)_4$ and $—(CH_2)_5$, at a temperature of from 0° C. to about 95° C. in an inert solvent not miscible with water as the reaction phase, the same being maintained as the upper layer, the lower layer comprising an aqueous phase, the latter serving as an extraction phase for separating out formed ammonium salts.

---

This invention relates to organosilicon nitrogen compounds and to an improved method for their production.

Silicon-nitrogen compounds, such as cyclic organo-silazanes or organoxysilazanes, silyldiamines, silylamines and disilylamines, have achieved considerable importance in silicon chemistry in recent years. These silazanes or silylamines can be reacted with organic compounds containing hydroxyl groups, as for example alcohols or phenols, to produce organoxysilanes. This method of silylation has proved very successful and superior to other methods. In particular, such reactions are very simple as regards the procedure involved, as no liquid or solid by-products are produced, and a pure product is obtained in a single operation. The ammonia or amine that escapes has no adverse effect on the organoxysilane product.

However, broad technical application of the silazanes has hitherto been limited by their difficult and expensive manufacturing process. The processes of the prior art are based on a procedure of reacting halogen silanes with ammonia or amines in an inert solvent which procedure involves a series of disadvantages.

One particular disadvantage of these processes is that they yield large amounts of ammonium salts in the form of voluminous precipitates which fill up the entire reaction chamber. As a result, the reaction solution is converted, in the course of the reaction, into a paste of poor uniformity that can no longer be satisfactorily homogenized, which necessarily results in prolonged reaction times, as the reaction is increasingly retarded and ultimately completely blocked. These processes furthermore cannot operate without uneconomically low initial concentrations of halogen silanes. Furthermore, because of the fineness and colloidal properties, the ammonium salt precipitates which are formed, and in particular the alkylated amines, can be separated from the dissolved reaction products often only with great difficulty and then only in a second procedure entailing filtration, suction filtering or settling methods such as centrifugation. Another disadvantage of the known procedure is that these precipitates have adsorbed considerable amounts of silazanes and therefore have to be washed or extracted with a large amount of solvents in still another procedure in order to recover the silazanes.

One object of the present invention is to provide a new and improved method of synthesizing organosilicon nitrogen compounds utilizing comparatively inexpensive starting materials and reagents and involving a reaction which is readily controllable.

Another object of the invention is to provide a new and improved method of synthesizing organosilicon nitrogen compounds in good yields from halogen silanes and trivalent compounds.

An additional object is to simplify the separation of the ammonium salts formed in reaction from the organosilicon nitrogen compounds.

Still further objects and the entire scope of applicability of the present invention will become apparent from the detailed description given hereinafter.

In accordance with the invention, it has now been found that organosilicon nitrogen compounds can be obtained by reacting halogen silanes of the formula $$(R_1R_2R_3)SiX$$

wherein $R_1$ and $R_2$ each represents a member of the group of hydrogen, halogen, $C_1$ to $C_{18}$ alkyl, alkenyl, cycloalkyl, aryl, alkoxyl or aroxyl, $R_3$ represents a member of the group of hydrogen, $C_1$ to $C_{18}$ alkyl, $C_1$ to $C_{18}$ alkenyl, cycloalkyl, aryl, alkoxyl, or aroxyl, and X is halogen, with compounds of trivalent nitrogen of the formula $(R_4R_5)NH$, wherein $R_4$ and $R_5$ each represents one of the group of hydrogen, $C_1$ to $C_{18}$ alkyl, $C_1$ to $C_{18}$ alkenyl, cycloalkyl or aryl, and jointly $R_4$ and $R_5$ can be $—(CH_2)_4$ or $—(CH_2)_5$ at a temperature of about 0° to about 95° C. in an inert solvent that is not miscible with water as the reaction phase and which is maintained over an aqueous phase constituting an extraction phase for ammonium salts that form in the reaction.

In the case of the reaction of a dihalogen silane of the general formula $(R_1R_2R_3)SiX$, wherein $R_2$ or $R_1$ represents halogen, and preferably chlorine, with a compound of trivalent nitrogen of the formula $(R_4R_5)NH$ wherein $R_5$ is hydrogen, that is, with a primary amine, cyclotrisilazanes of Formula I are obtained as the main reaction product, and N,N'-substituted diaminosilanes of Formula II as a by-product (see Example 2 infra).

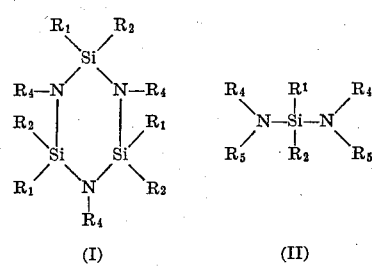

(I)                           (II)

If, however, $R_4$ and $R_5$ are each hydrogen, i.e., if the nitrogen compound is ammonia, then, in addition to the main product of Formula I, cyclotetrasilazanes of Formula III are produced (see Examples 1 and 4 infra). In these cases, furthermore, polymers may be formed in small amounts as by-products (Formula IV).

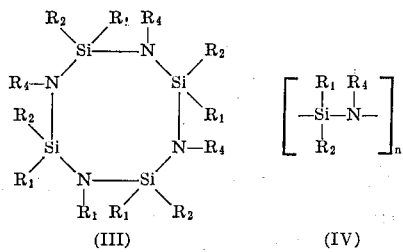

(III)        (IV)

If, on the other hand, a dihalogen silane of the aforesaid type is reacted with a nitrogen compound of the formula $(R_4R_5)NH$, wherein $R_4$ and $R_5$ do not represent H, that is, with a secondary amine, then N,N,N',N'-substituted diaminosilanes of Formula II are obtained as the reaction product (see Example 3 infra).

Finally, monohalogen silanes of the general formula $(R_1R_2R_3)SiX$, wherein X is preferably chlorine, can be reacted with the above-named nitrogen compounds, thereby making it possible to obtain silazanes of the following Formulas V and VI (see Example 6 infra):

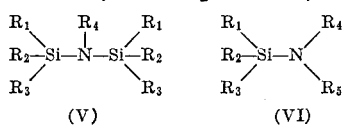

(V)        (VI)

In the manufacture of organosilicon compounds the organo-substituents $R_1$, $R_2$ and $R_3$ of which consist only of alkyl groups, it is preferable to operate at a temperature of about 0° to about 35° C.

The ammonium salts formed in the reaction, e.g., the ammonium chlorides, are continuously removed from the actual reaction phase in the process according to the invention, by stirring, whereby they are absorbed by the second and underlying aqueous phase which serves as an extracting phase. It is not necessary that these salts be completely dissolved by the aqueous phase and they may be suspended in it in some cases.

The volume of the aqueous phase depends on the quantity and on the solubility of the ammonium salt that is produced in each case. It is expedient to augment it in the course of the reaction by the continuous or periodical addition of water or of aqueous solutions of inorganic salts or alkalis. By this means it is brought about that the continuously formed ammonium salts are wetted by the aqueous phase saturated or supersaturated with these salts, and are held in this aqueous phase. It is expedient to adjust the aqueous phase to make it neutral or alkaline, this being achieved by the addition of neutral, water-soluble salts as, for example, such salts as ammonium, alkali or alkaline-earth nitrates, chlorides, sulfates, etc., up to the point of saturation if desired, or by the addition of water-soluble, basically reacting carbonates, such as sodium or potassium carbonate or bicarbonate, and/or bases such as ammonium hydroxide and alkali and alkaline-earth hydroxides, which are to be present for the most part in low concentrations. The neutral and basic additives can be used in mixtures or by themselves.

Insert solvents which are not miscible with water serve as the actual reaction phase. These are suitable for use in the process of the invention, those hydrophobic liquids which do not enter into chemical reactions with the starting products nor with the reaction products, and which, under the conditions of the reaction, dissolve the organosilicon nitrogen compounds formed, or at least the nitrogenous components of the starting products as well. If both of the starting products are gases under the conditions of reaction, it is sufficient if only the end products are soluble in the reaction phase. The following are given by way of example and are selected from the many solvents suitable for the purpose herein: aliphatic, cycloaliphatic and aromatic hydrocarbons, such as pentane, hexane and higher homologs thereof, liquid paraffin hydrocarbons or their mixtures, such as, for example paraffin fractions and polyolefins of low molecular weight, cyclohexane, benzene, toluene, xylenes and the like, liquid alkyl silanes, such as tetramethyl and tetraethyl silane, hexamethyl disilane, and also siloxanes such as hexamethyl disiloxane, etc. As a rule the solvent selected to serve as the reaction phase should be one whose boiling point is lower than the boiling point of the lowest-boiling end product. The reaction phase may, if desired, contain small amounts of a dissolved catalyst of the kind customarily used in reactions of instant type, such as pyridine, for example.

The organosilicon compounds, cyclotrisilazanes, N,N'-substituted diaminosilanes, cyclotetrasilazanes, and the polymers (Formulas I–IV supra) are easily and efficiently obtainable according to the process of the invention, on a technical scale, and with very good yields in volume per unit of time. The process eliminates the difficulties and disadvantages as above set out of the prior-art processes and makes possible the manufacture of the organosilicon nitrogen compounds in an up to 50% solution. It is possible to operate the process continuously. The purification process is simple requiring only filtration and washing or extraction of the ammonium salts which are produced to eliminate the same.

After a simple separation of the reaction phase from the aqueous phase, for example in a separatory funnel or the like, there are obtained the organosilicon nitrogen compounds, which can be used directly in solution, if desired, as for example in silylation reactions. They can be recovered in pure form by evaporating away the solvent and by distillation or crystallization.

The following examples are given to illustrate the invention, it being understood that these examples are not intended to be limitative with respect to the specific details thereof.

EXAMPLE 1

2.8 liters of benzene were floated over 250 ml. of saturated aqueous solution of potassium nitrate in a 5-liter round-bottomed flask provided with an agitator, dropping funnel, reflux condenser, internal thermometer and a tube for the introduction of gas. A slow-running anchor agitator was used, the same being immersed only in the benzene stratum so as not to stir up the aqueous phase. The gas introduction tube was so installed that its outlet was directed upwardly in the benzene layer, beneath the surface of the benzene and under the outlet of the dropping funnel.

Dimethyldichlorsilane was introduced from the dropping funnel in 20 ml. portions while a very strong current of ammonia was fed in and the agitator was kept running at a slow rate, an internal temperature of less than 35° C. being maintained by external cooling with ice water. Following each addition of 400 g. dimethyldichlorsilane, 100 ml. of saturated potassium nitrate solution was added to the aqueous phase. In this manner within 75 minutes, a total of 1290 g. of dimethyldichlorsilane had been brought to reaction. After the settling out of the remaining solid ammonium chloride, the benzene phase was siphoned off from the aqueous phase, shaken with dry sodium sulfate, filtered, and the resulting benzene distilled off using a 60 cm. packed column. Following vacuum distillation of the crude silazane fraction, 464 g. of hexamethylcyclotrisilazane was obtained having a B.P.$_{13}$=78–81° C. ($n_D{}^{20}$=1.4441), 178 g. of octamethylcyclotetrasilazane having a B.P.$_7$=103–106° C.

(M.P.=95–97° C.)

and 34 g. of oily polymeric silazanes as a residue.

EXAMPLE 2

In an apparatus similar to the one described in Example 1, 2.8 liters of benzene were floated onto 200 ml. of a 10 N caustic potash solution saturated with potassium nitrate. The procedure followed was analogous to that set out in Example 1, but using gaseous methylamine and with the further addition of 50 ml. of 10 N caustic potash solution to the aqueous phase following each addition of 400 ml. of dimethyldichlorsilane. A total of 1290 g. of dimethyldichlorsilane had been reacted within 120 minutes. After separation carried out as in Example 1, the crude silazane fraction was distilled and, in addition to 21 g. of a fraction of N,N'-dimethyldiaminodimethylsilane boiling at 116-120° C., 706 grams of nonamethylcyclotrisilazane were obtained having a B.P.$_{40}$=110-112° C., which when cooled below 0° C. hardened into crystals melting at 30-34° C. 89 grams of polymer were left in the distillation residue. The total yield amounted to about 93%.

EXAMPLE 3

Following the procedure of Example 1, 2.2 liters of pentane were floated onto 70 ml. of a 10 N caustic potash solution which had been saturated with potassium nitrate, and the reaction carried out with the introduction of gaseous dimethylamine. After 550 ml. of dimethyldichlorsilane had been reacted, a further 70 ml. of 10 N caustic potash solution was added to the hydrophilic phase. Within 120 minutes, a total of 903 g. of dimethyldichlorsilane had been reacted. After another 20 minutes of stirring, the internal temperature had dropped to 23° C. In the purification process which was conducted as in Example 1, 890 grams of N,N,N', N'-tetramethyldiaminodimethylsilane having a B.P. 128-129° C. ($n_D^{21}$=1.4184) were isolated. This corresponded to a yield of 87%.

EXAMPLE 4

850 ml. of benzene were floated onto 85 ml. of saturated potassium nitrate solution contained in a 2-liter round-bottom flask forming part of an apparatus constructed similarly to the one in Example 1, and, as in Example 1, ammonia was reacted with 423 g. of vinylmethyldichlorsilane. A further 80 ml. of saturated potassium nitrate solution was added to the aqueous phase each time that 200 ml. of chlorsilane had been reacted. The reaction was completed after a period of 50 minutes. Purification resulted in the production of 154 g. of trimethyltrivinylcyclotrisilazane having a B.P.$_{.11}$=106-109° C. ($n_D^{21}$=1.4802), 44 g. of tetramethyltetravinylcyclotetrasilazane of B.P.$_{.4}$=104-107° C. ($n_D^{20}$=1.4947) and 30 g. of polymers. This corresponded to a yield of 89%.

EXAMPLE 5

The procedure set out in Example 1 was followed. Ammonia was reacted with 362 g. of methylphenyldichlorsilane at an internal temperature of 30 to 50° C. in 700 ml. of benzene containing 1 ml. of pyridine by floating on 70 ml. of water. The aqueous phase did not have to be augmented during the reaction. Purification was carried out following three hours of reaction and resulted in the production of 137 g. of trimethyltriphenylcyclotrisilazane having a B.P.$_{0.2}$=192-194° C., which hardened in the condenser and in the receiver during the distilation. After recrystallization from a mixture of pentane and benzene, the trimethyltriphenylcyclotrisilazane had a melting point of 112-114° C. 85 g. of highly viscous liquid polymers remained in the distillation residue. The total yield amounted to 85%.

EXAMPLE 6

1085 g. of trimethylchlorsilane and ammonia were reacted over a period of 80 minutes in a manner similar to that of Example 1, in 2.6 liters of pentane by floating on 50 ml. of 10 N caustic potash solution saturated with 50 ml. of potassium nitrate. The aqueous phase was augmented by the periodic addition of 10 N caustic potash solution saturated with potassium nitrate, to a total of 400 ml. 818 g. of hexamethyldisilazane were recovered having a boiling point of 126° C. ($n_D^{20}$=1.4075). This corresponded to a yield of 93%.

EXAMPLE 7

500 ml. of cyclohexane were floated over 30 ml. of saturated aqueous solution of ammonium sulfate in a 1-liter round-bottom flask provided with an agitator, dropping funnel, reflux condenser, internal thermometer and a tube for the introduction of gas. A slow-running anchor agitator was used, the same being immersed only in cyclohexane stratum so as not to stir up the aqueous phase. The gas introduction tube was so installed that its outlet was directed upwardly in the cyclohexane layer, beneath the surface of the cyclohexane and under the outlet of the dropping funnel.

Tert.butoxymethyldichlorsilane was introduced from the dropping funnel in 20 ml. portions while a very strong current of ammonia was fed in and the agitator was kept running at a low rate, an internal temperature of less than 35° C. being maintained by external cooling with ice water.

In this manner within 60 minutes a total of 80 g. of methyl-tert.butoxy-dichlorsilane had been brought to reaction. After the settling out of the remaining solid ammonium chloride, the cyclohexane phase was siphoned off from the aqueous phase, shaken with dry sodium sulfate, filtered, and the resulting cyclohexane distilled off. The remaining crude silazane may be directly (90% yield) used. A part of this product was vacuum distilled, boiling point 142° C. at 0.6 mm. Hg, $n_D^{20}$=1.4397.

EXAMPLE 8

60 g. of hydroxy-di(tert.butoxy)chlorosilane has been reacted according to Example 7 to give a 90% yield of di-silazane boiling 100° C.-102° C. at 15 mm. Hg.

EXAMPLE 9

79 g. of hydrogen-tert.butoxy-dichlorsilane has been reacted according to Example 7 to give a 92% yield of silazane. A sample of the obtained product boiled at 105° C.-107° C. (6 mm. Hg.), $n_D^{20}$=1.4447.

EXAMPLE 10

100 g. of di(tert.butoxy)dichlorosilane has been analogously converted. A crude silazane ($n_D^{20}$=1.4174) has been obtained. A sample was distilled to give 60% hexa-tert.butoxy-cyclo-trisilazane, boiling at 60° C. (1 mm. Hg), $n_D^{20}$=1.4174 and to leave indistillable polymer silazanes of the same refractive index.

EXAMPLE 11

80 g. of vinyl-tert.butoxydichlorsilane has been converted analogously to give 70% silazane boiling at 141-145° C. (0.5 mm. Hg), $n_D^{20}$=1.4588 and 26% of polymer silazanes, $n_D^{20}$=1.4588.

We claim:
1. A process for preparing organo-silicon nitrogen compounds which comprises reacting together
 (a) a halogen silane of the formula ($R_1R_2R_3$)SiX wherein $R_1$ and $R_2$ which need not be the same, are selected from the group consisting of hydrogen, $C_1$ to $C_{18}$ alkyl, alkenyl, cycloalkyl, aryl, alkoxyl, aralkoxyl and halogen, $R_3$ is a member selected from the group consisting of hydrogen, $C_1$ to $C_{18}$ alkyl, alkenyl, cycloalkyl, aryl, alkoxy and aroxyl, and X represents halogen, and
 (b) a gaseous compound of trivalent nitrogen having the formula ($R_4R_5$)NH wherein $R_4$ and $R_5$ are each a member selected from the group consisting of hydrogen and lower alkyl, at a temperature in the range of about 0° C. to about 95° C. in an inert solvent not miscible with water as the reaction phase, the same being maintained as the upper layer, the lower layer comprising an aqueous phase, the latter serving as an extraction phase for separating out formed ammonium salts.
2. Process according to claim 1, wherein the substituents $R_1$, $R_2$ and $R_3$ each represents alkyl and the reac- tion is effected at a temperature of about 0 to about 35° C.

3. Process according to claim 1, which comprises regulating the volume of the aqueous phase in consideration of the quantity and the solubility of the ammonium salts formed in the reaction and maintaining said volume small at the beginning of the reaction and augmenting the same as the reaction progresses by controlled addition of water.

4. Process according to claim 3 wherein the volume of the aqueous phase is adjusted so that in the course of the reaction a saturated to supersaturated ammonium salt solution is formed.

5. Process according to claim 1, which comprises incorporating at least one member selected from the group consisting of ammonium, alkali metal and alkaline earth metal nitrates, chlorides and sulfates, alkali metal and alkaline earth metal carbonates and bicarbonates, ammonium, alkali metal and alkaline earth metal hydroxides, into the aqueous phase.

6. Process according to claim 1, wherein said halogen silane is a chlorosilane.

7. Process according to claim 1, wherein said water-immiscible solvent is a member selected from the group consisting of aliphatic, cycloaliphatic and aromatic hydrocarbons, liquid alkyl silanes and liquid siloxanes.

8. Process according to claim 7, wherein said water-immiscible solvent has a boiling point which is lower than the boiling point of the lowest boiling product formed in the reaction.

9. Process according to claim 1, wherein said reaction phase contains pyridine as catalyst.

References Cited

UNITED STATES PATENTS

| | | | |
|---|---|---|---|
| 2,462,635 | 2/1949 | Haber | 260—448.2 |
| 2,553,314 | 5/1951 | Haber | 260—448.2 XR |
| 2,564,674 | 8/1951 | Cheronis | 260—448.2 |
| 2,570,719 | 10/1951 | Rudel | 260—448.2 XR |
| 2,579,416 | 12/1951 | Cheronis | 260—448.2 XR |
| 2,579,417 | 12/1951 | Cheronis | 260—448 XR |
| 2,579,418 | 12/1951 | Cheronis | 260—448.2 XR |
| 2,885,370 | 5/1959 | Groszos et al. | 260—448.2 XR |
| 3,007,886 | 11/1961 | Parker | 260—448.2 XR |
| 3,036,019 | 5/1962 | Molotsky et al. | 260—448.2 XR |
| 3,043,798 | 7/1962 | Boyer | 260—448.2 XR |

TOBIAS E. LEVOW, Primary Examiner

P. F. SHAVER, Assistant Examiner

U.S. Cl. X.R.

23—190, 366